(12) United States Patent
Walkden

(10) Patent No.: US 6,758,514 B1
(45) Date of Patent: Jul. 6, 2004

(54) FOLDING SIDEWALL ASSEMBLY FOR TRUCK BEDS

(76) Inventor: Charles D. Walkden, P.O. Box 2017, Homer, AK (US) 99603

(*) Notice: Subject to any disclaimer, the term of this patent is extended or adjusted under 35 U.S.C. 154(b) by 0 days.

(21) Appl. No.: 10/226,166

(22) Filed: Aug. 23, 2002

(51) Int. Cl.$^7$ .............................................. B62D 33/027
(52) U.S. Cl. ..................... 296/183; 296/26.15; 296/165; 296/174
(58) Field of Search ........................ 296/183, 14, 165, 296/169, 174, 26.12, 26.15, 57.1, 32, 36, 51, 10; 16/50, 221, 319

(56) References Cited

U.S. PATENT DOCUMENTS

| | | | | |
|---|---|---|---|---|
| 709,193 | A | * | 9/1902 | Barson |
| 748,246 | A | * | 12/1903 | Williams |
| 809,388 | A | * | 1/1906 | Mills |
| 841,716 | A | * | 1/1907 | Quick |
| 953,509 | A | * | 3/1910 | Bird |
| 1,022,296 | A | * | 4/1912 | Brelsford |
| 1,060,418 | A | * | 4/1913 | Beach et al. |
| 1,166,877 | A | * | 1/1916 | Younce |
| 1,228,117 | A | * | 5/1917 | Kennel |
| 1,328,130 | A | * | 1/1920 | Crandall |
| 1,441,859 | A | * | 1/1923 | Klimcovitz |
| 1,456,630 | A | * | 5/1923 | Eaton et al. |
| 1,837,247 | A | * | 12/1931 | Wolters et al. |
| 1,883,473 | A | * | 10/1932 | Barrett |
| 2,660,750 | A | * | 12/1953 | Wallen |
| 3,977,545 | A | * | 8/1976 | Lloyd .......................... 296/61 |
| 4,601,632 | A | * | 7/1986 | Agee ........................... 296/61 |
| 4,900,217 | A | * | 2/1990 | Nelson ........................ 296/26 |
| 6,644,708 | B1 | * | 11/2003 | Grzegorzewski et al. ..... 296/32 |

* cited by examiner

Primary Examiner—D Dayoan
Assistant Examiner—H Gutman
(74) Attorney, Agent, or Firm—Alfred F. Hoyte, Jr.

(57) ABSTRACT

A pickup truck modification includes opposing, hingedly attached sidewalls for effectively extending the width of a truck bed. The sidewalls may be selectively positioned vertically or horizontally, and, when positioned horizontally, allow for positioning relatively wide loads. The truck bed is effectively widened as the sidewalls are laterally positioned in weight bearing relation by abutment members which depend from the sidewalls. Loads wider than the truck bed, but not substantially exceeding the additional width created by the laterally extended sidewalls, may be placed on the truck bed with the excess portion of the load supported by the sidewalls. When used in combination with an extendable ramp assembly, loading and unloading of bulky loads is greatly facilitated.

2 Claims, 5 Drawing Sheets

FOLDING SIDEWALL ASSEMBLY FOR TRUCK BEDS

BACKGROUND OF THE INVENTION

1. Field of the Invention

The present invention relates to modifications for truck beds. More specifically, it relates to a folding sidewall assembly which facilitates loading and storage of wide loads.

2. Description of the Prior Art

With the recent popularity of sport utility vehicles (SUVs), there has been a corresponding increase in interest in light trucks of all kinds, including pickup trucks. Indeed, most major car and truck manufacturers are now offering SUVs which can be converted to pickup trucks by removing and storing a few body panels. Pickup truck modifications of all types have been available for years, which modifications would include campers and ramp assemblies.

As the interest in off road vehicles has increased, so has the interest in other recreational vehicles such as jet skis, snowmobiles, all terrain vehicles (ATVs) etc., which are generally single occupant vehicles adapted for a specific use. Typically, it is desired to first drive the recreational vehicle to an area specifically suited to allow the user to take advantage of the unique capabilities offered by the vehicle. This is usually accomplished by loading the vehicle into an open bed truck, and driving the truck to the desired location. A problem often encountered with this arrangement is that it is difficult, if not impossible, to load two such recreational vehicles onto a single truck bed due to space constraints. More often than not it is the width of the truck bed, as defined and limited by the sidewalls, which presents the biggest obstacle to loading multiple recreational vehicles onto a single truck. Accordingly, it would be desirable to provide a pickup truck which is modified to accommodate two or more recreational vehicles. While pickup trucks having modified or adjustable sidewall assemblies are known, the prior art does not disclose a sidewall assembly useful for effectively extending the width of the truck bed of a pickup truck.

The following known prior art has been directed to providing a summary of the devices of the prior art. As will be seen, the simplicity and effectiveness of my invention is not rivaled in the prior art.

U.S. Pat. No. 6,196,603 issued to Schambre, et al., discloses a drop down gate assembly for a pick up truck. The gate assembly is disposed in the sidewall of the pickup truck to allow side access to the truck bed.

U.S. Pat. No. 4,328,988 issued to Patterson discloses a bed for a pickup truck having side gates in the sidewalls thereof and a tailgate in the rear wall thereof having exterior contours identical to the exterior contours of the wall within which the gates are located, to provide increased accessibility to the interior of the bed and an aesthetically appealing design.

None of the above inventions and patents, taken either singly or in combination, is seen to describe the instant invention as claimed.

SUMMARY OF THE INVENTION

Briefly, the invention comprises a truck bed modification wherein the truck bed is effectively extended laterally by providing opposing, hingedly attached sidewalls. The sidewalls may be selectively positioned vertically or horizontally, and, when positioned horizontally, allow for positioning relatively wide loads. The truck bed is effectively widened as the sidewalls are laterally positioned in weight bearing relation by abutment members which depend from the sidewalls. Loads wider than the truck bed, but not substantially exceeding the additional width created by the laterally extended sidewalls, may be placed on the truck bed with the excess portion of the load supported by the sidewalls. When used in combination with an extendable ramp assembly, loading and unloading of bulky loads is greatly facilitated.

Accordingly, it is a principal object of the invention to provide a new and improved truck bed which overcomes the disadvantages of the prior art in a simple but effective manner.

It is a major object of this invention to provide a pickup truck modification which increases the effective width of a truck bed.

It is another object to provide a truck bed modification which can be used in combination with an extendable ramp assembly.

It is another object to provide a truck bed modification where the truck bed sidewall can be folded down in weight bearing relation to the truck bed to laterally extend the weight bearing surface area of the truck bed.

Finally, it is a general goal of the invention to provide improved elements and arrangements thereof in an apparatus for the purposes described which is dependable and fully effective in accomplishing its intended purposes.

Thus it can be seen that the potential fields of use for this invention are myriad and the particular preferred embodiment described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown article of manufacture. It is to be understood from the outset that the scope of this invention is not limited to these fields or to the specific examples of potential uses presented hereinafter.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
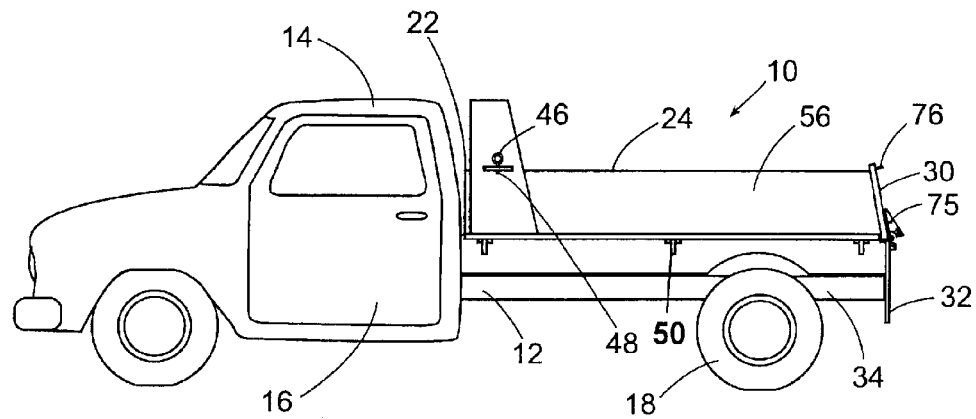
FIG. 1 is a side view of a truck having a truck bed assembly incorporating the folding sidewall assembly of the present invention.
Figure 2:
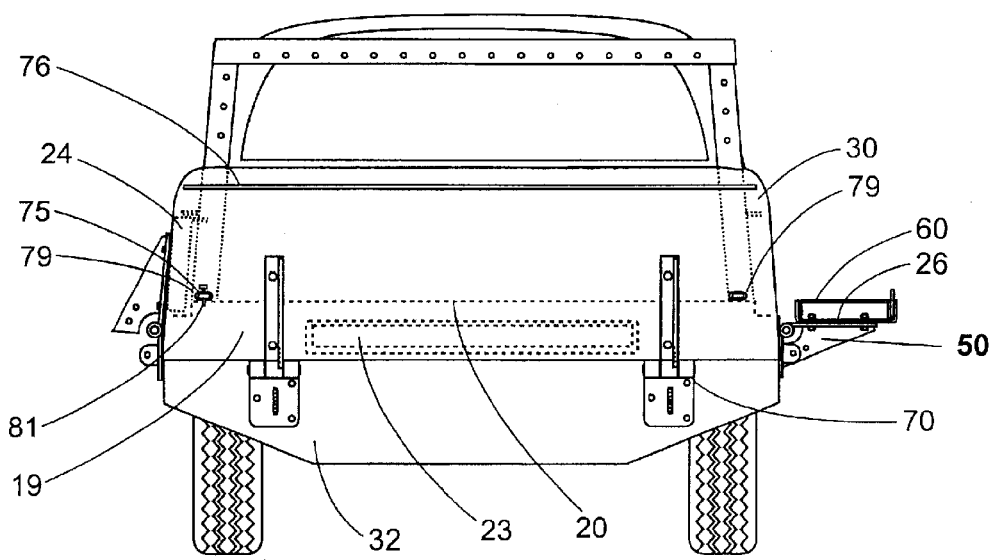
FIG. 2 is a rear view of the truck, partly in section, illustrating one of the sidewalls in the lateral position.
Figure 3:
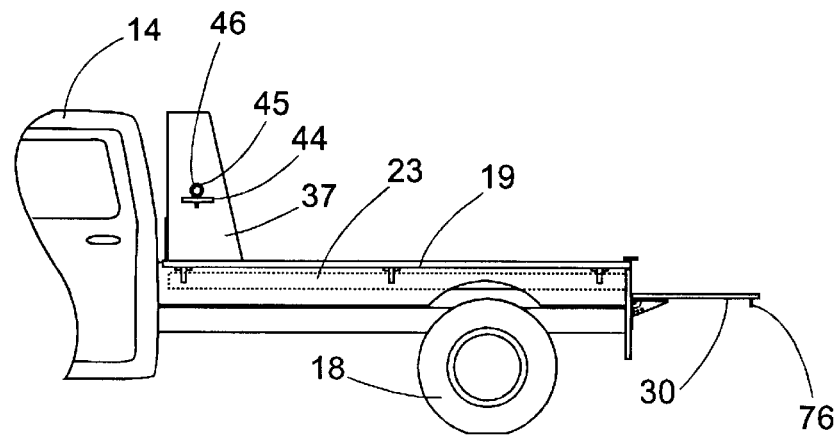
FIG. 3 is a side view of the truck bed assembly with both sidewalls and the tail gate folded down into the lateral position.
Figure 4:
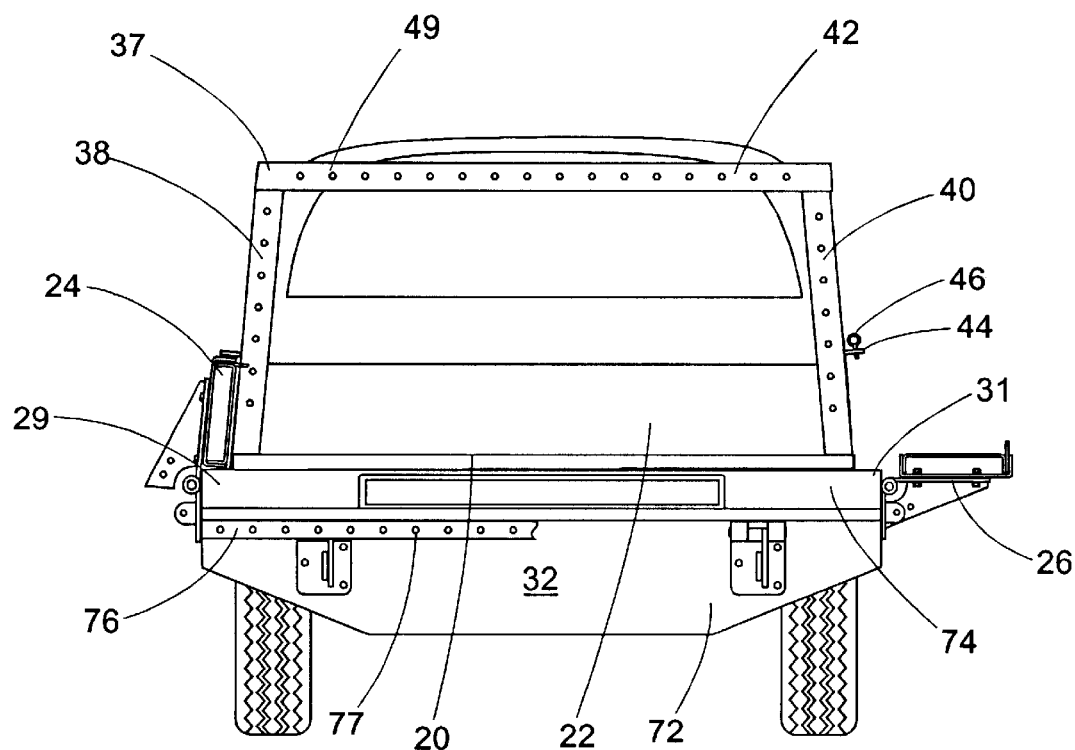
FIG. 4 shows a rear view of the truck with the tail gate folded into the lateral position.

Referring to FIGS. 1–9, the bed assembly of the present invention, generally indicated by the numeral 10, is shown. With particular reference to FIGS. 1–4, the bed assembly 10 is illustrated mounted on a light duty pickup truck chassis 12, the chassis including parallel mounting bars (not shown) upon which a conventional truck bed may be mounted as is well known in the art. It should be noted that the bed assembly 10 of the present invention may be used with any cargo carrying vehicle but is particularly useful with a light duty truck such as a pickup truck as discussed above. The bed of the present invention 10, which is bolted, welded or otherwise securely attached to the parallel mounting bars, extends from a position just behind the cab 14 of the vehicle 16 to a rearward position extending beyond the rear wheels 18 of the vehicle 16. The pickup truck bed 10 main body is a load bearing platform 19 including a floor 20 from which a front wall panel 22 may optionally extend upwardly. Preferably, an extendable ramp assembly is positioned within sleeve 23 beneath the floor 20 to facilitate loading of cargo. A ramp assembly such as that disclosed in U.S. Pat. No. 5,795,125, issued to the present inventor Charles D. Walkden, and herein incorporated by reference, may be used for this purpose. Sidewalls 24 and 26 extend rearwardly from said front wall 22 to rear tailgate 30 which is hingedly attached to vertical end wall 32, which is securely attached, e.g., by welding, to end portion 34 of the platform 19. The sidewalls 24, 26 are hingedly attached to the sides 29, 31 of the platform 19 to allow for movement from an upright position to a horizontal load bearing position which effectively provides a lateral extension for the floor 20 of the platform 19 as will be explained in more detail later. It should be noted that there is a legal limit to the width allowed for vehicles using public roads, and in accordance with one aspect of the invention the lateral extension provided by folding sidewalls 24, 26 is equal to, but does not exceed the legal limit. It can be seen that the sides 29, 31 of the platform 19 have arcuate indentations or wheel wells formed therein to accommodate vertical displacement of the platform 19 relative to the wheels 18.

Attached to and extending upwardly from the front end of platform 19 is a mounting bracket 37, commonly known as a headache rack, which serves to facilitate. connecting various accessories to the vehicle 16 such as spotlights, spare tires, etc. The bracket 37 includes opposing upstanding members 38, 40 connected at their top ends by horizontal member 42. Additional horizontal frame members may extend between upstanding members 38, 40 as is well known in the art, the additional frame members serving to accommodate the attachment of additional accessories. Flanges 44 depending from the exterior of upstanding members 38, 40 have at least one aperture 45 sized to receive a bolt 46, the apertures 45 axially alignable with bores 48 formed in sidewalls 24, 26 to allow insertion of bolt 46 into and through the aperture 45 and into the bore 48 to effect locking of the sidewall 24, 26 in the upright position. A series of regularly spaced apertures 49 are formed in mounting bracket 37 to facilitate the use of cables to tie down large loads.

Figure 5:
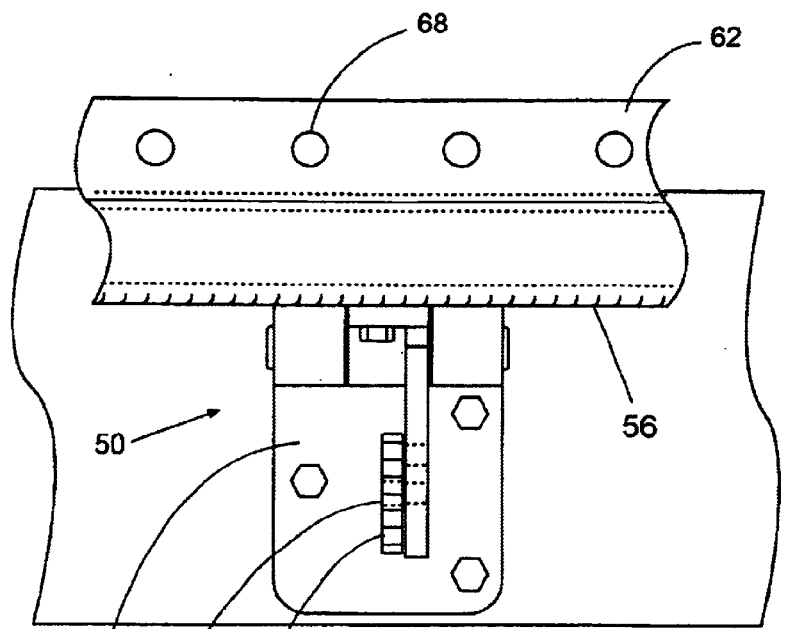
FIG. 5 shows a plan view of the locking hinge plate of the invention in the folded position.
Figure 6:
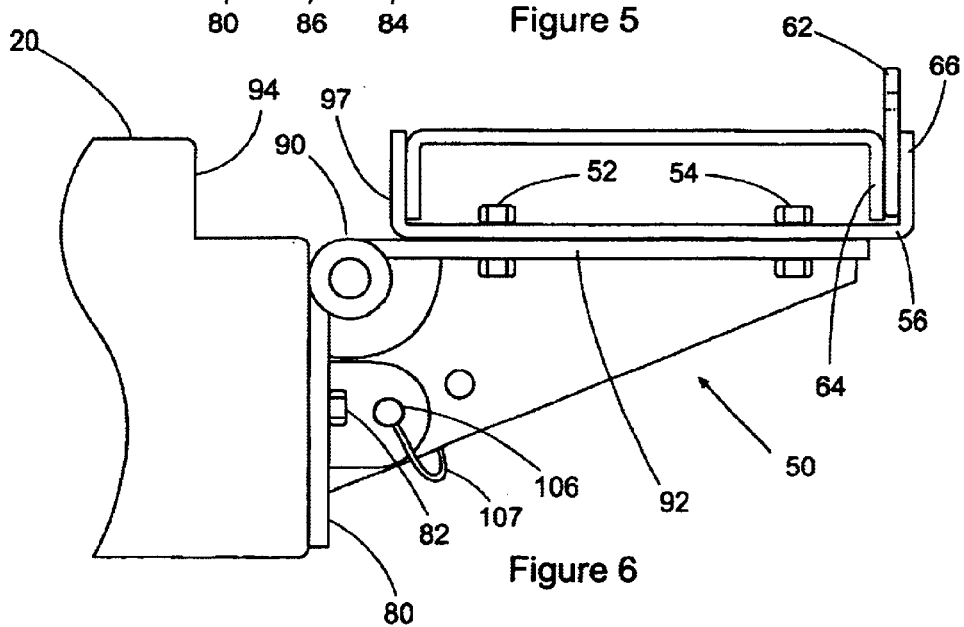
FIG. 6 shows a side view of the locking hinge plate in the folded position.
Figure 7:
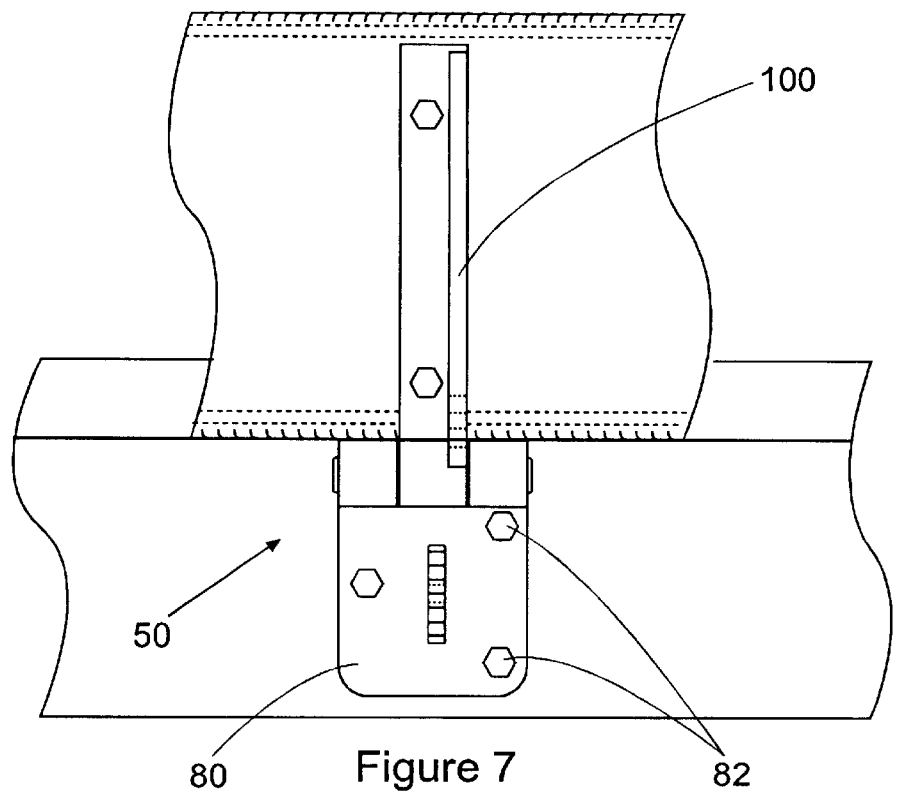
FIG. 7 shows a plan view of the locking hinge plate of the invention in the upright position.
Figure 8:
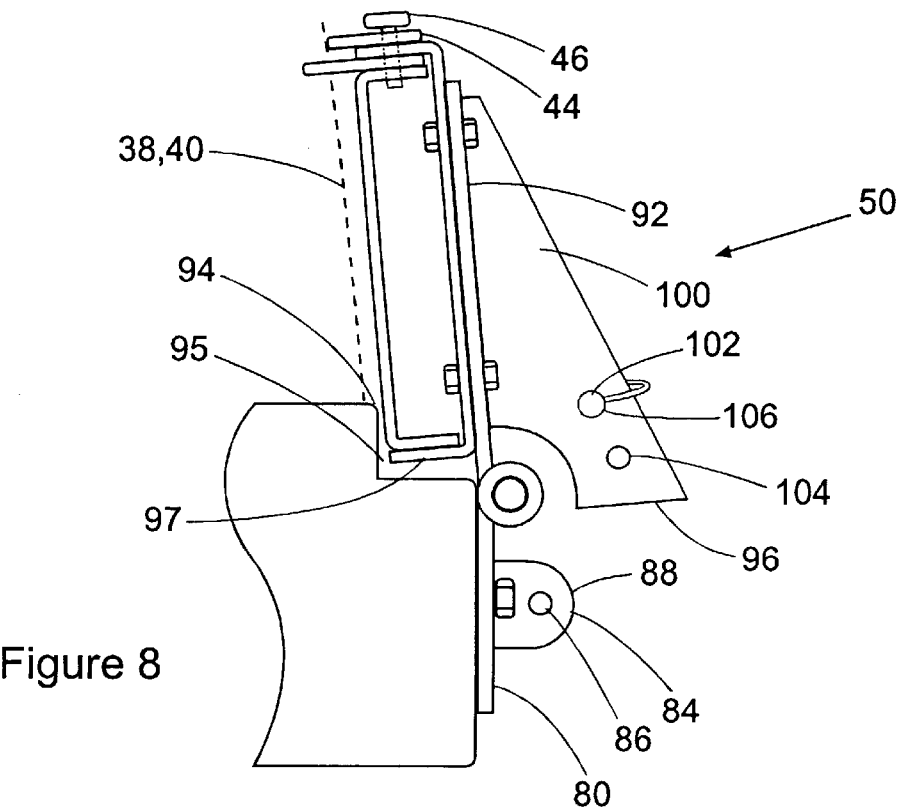
FIG. 8 shows a side view of the locking hinge plate of the invention in the folded position.
Figure 9:
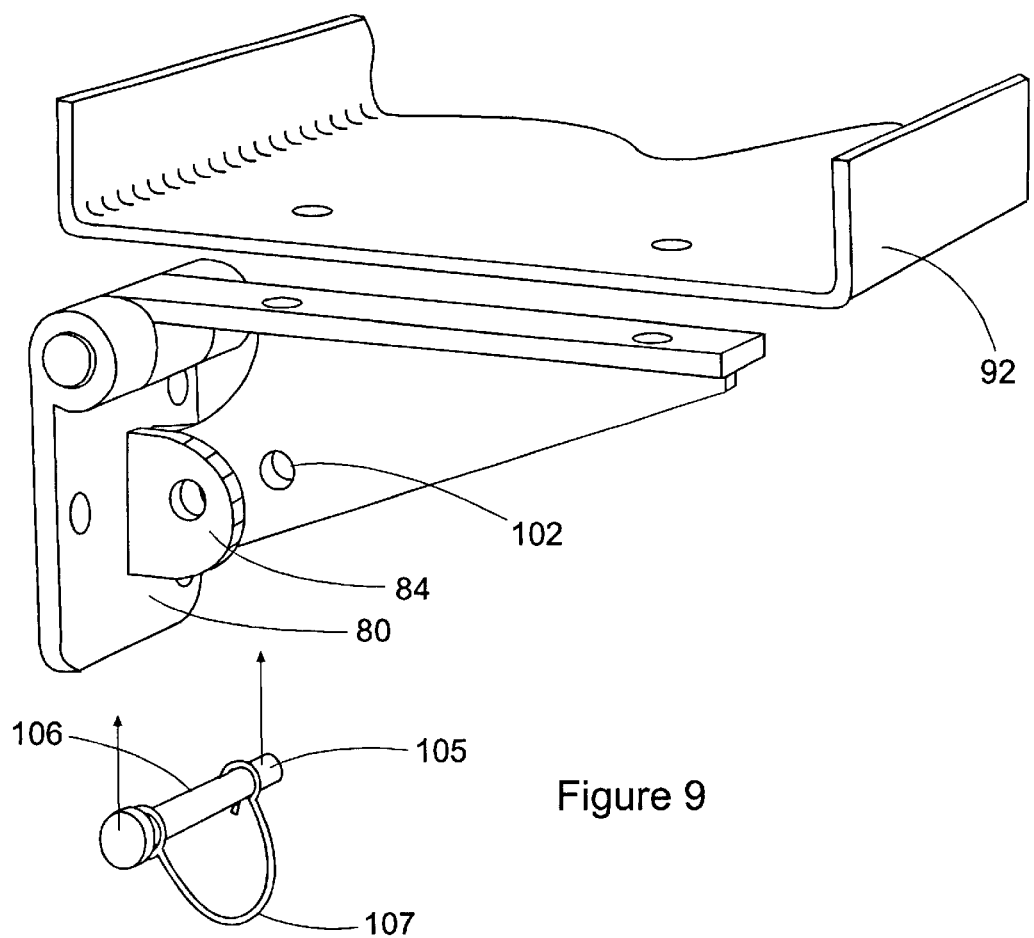
FIG. 9 shows a perspective view of the locking hinge plate of the invention in the folded position.

Referring now to FIGS. 5 and 6, details of the sidewall 24, 26 construction are shown. Each sidewall 24, 26 has at least a pair of longitudinally spaced hinges 50 connected thereto by way of bolts 52, 54 which protrude through an elongated main outer body member 56 having a U-shaped cross section. An inner main body member 60, also having a U-shaped cross section and co-extensive with outer body member 56 provides a weight bearing surface upon which cargo may be positioned. It can be seen that the U-shaped member 60 is inverted relative to member 56, and may be connected thereto by welding. A flange 62, coextensive with members 56, 60, is positioned between the outer surface of wall 64 of inner main body member 60 and the inner surface of wall 66 of outer main body member 56 and is securely fastened thereto. A series of regularly spaced apertures 68 formed in flange 62 facilitate the use of ropes or cables to tie down cargo. The flange 62 also provides a vertical abutment surface when the sidewalls 24, 26 are in the horizontal position.

Tailgate 30 is attached to end wall 32 by hinges 70 which are identical in form and function to hinges 50. Downwardly depending abutment surface 72 of end wall 32 is coplanar with endwall 74 of platform 19 to allow tailgate 30 to pivot between a horizontal loading position and an upright closed position. Flange 76, which is identical to flange 62, is disposed across and securely fastened to the top end of tailgate 30, and includes cable apertures 77. Opposing apertured tabs 75 extending from floor 20 are aligned with slots 79 in the tailgate 30 for protrusion therethrough when the tailgate 30 is in the upright, closed position, the horizontally disposed apertures in the tabs sized to receive eye bolts 81. Insertion of eye bolts through locking tabs 75 effectively locks the tailgate 30 in the upright position. Hinges 70 are configured to allow substantial loading upon tailgate 30 as will be discussed in reference to FIGS. 5–9.

With particular reference to FIGS. 5–9, the hinge assembly 50 is shown. Each hinge 50 is pivotable between an open position wherein sidewalls 24, 26 are substantially upright and a right angle position wherein sidewalls 24, 26 are horizontal, and includes a hinge plate 80 which is flush mounted to the sides 29, 31 of platform 19, e.g., by bolts 82 or other secure fastening means. U-shaped locking tab 84 extends perpendicularly from hinge plate 80 and includes an aperture 86 positioned centrally of end portion 88. Knuckle 90 of hinge 50 is relatively robust and allows for pivoting motion of opposing hinge plate 92 in a manner well known in the art. The opposing hinge plate 92 is fixedly mounted to main outer body member 56. Pivoting of the sidewalls 24, 26 is limited to an approximate 90 degree arc, the upper limit of the pivot bounded by the edge 94 of the platform floor 20 which forms an elongated recess 95 within which lower interior edge 97 of sidewall 24, 26 is positioned when the sidewalls 24, 26 are in the upright position. The lower limit of the pivot is bounded by abutment edge 96 of stop member 100 as it comes to rest against hinge plate 80. Thus, in the upright position sidewalls 24, 26 rest against the edge 94 of the platform floor 20, while in the horizontal position abutment edge 96 rests against hinge plate 80 in weight bearing relation thereto.

Stop member 100, which has a substantially right triangular profile, extends perpendicularly from hinge plate 92 with abutment edge 96 forming a right angle therewith. A pair of apertures, storage aperture 102, and locking aperture 104 positioned proximate abutment edge 96 are sized to receive locking pin 106, the diameter of the pin 106 chosen to provide a marginal frictional fit within apertures 102, 104. Aperture 104 is axially aligned with aperture 86 when sidewall 24, 26 is in the horizontal position. Locking pin 106 includes a U-shaped wire retention member 107 which limits axial displacement of the pin 106 whether in storage aperture 102 or locking aperture 104.

In operation, when lateral extension of floor 20 is needed to accommodate wide loads, one or both of sidewalls 24, 26 may be folded down into the horizontal position. With the tailgate 30 open, the ramp assembly may be extended. When in the horizontal position, abutment edge 96 of stop member 100 is flush against hinge plate 80 distributing the weight of sidewall 24, 26 along stop member 100 which functions essentially as a truss. The sidewalls 24, 26 can be locked into position by pushing end 105 of locking pin 106 into and through axially aligned apertures 104 and 88. Loads may be secured by threading, or otherwise attaching, cables (not shown) through apertures 68 and 77 as has been previously mentioned. In the upright position, locking pin 106 is stored in storage aperture 102. The use of storage aperture 102 to store locking pin 106, in lieu of locking aperture 104 obviates the need to remove the locking pin before folding down the sidewall 24, 26. It can be appreciated that if locking pin 106 were stored in aperture 104, the pin would become lodged against the end portion 88 of locking tab 84 before horizontal positioning of the sidewall is completed, and thus the pin 106 would have to be removed from aperture 104 before repositioning sidewalls 24, 26 from the upright to the horizontal position. Hinge 70 of the tailgate 30 functions in exactly the same manner as hinge 50, so that tailgate 30 may be locked in the horizontal position to effect loading. As previously mentioned, a ramp assembly is preferably stored in sleeve 23, the ramp assembly allowing for rolling wheeled vehicles, hand trucks, etc. from the ground into the truck bed. In order to best facilitate the loading process, the ramp assembly provides a continuous transport surface as described in the above referenced patent.

It is to be understood that the provided illustrative examples are by no means ex-haustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions. For example, a mechanical linkage may be operatively connected to a source of motive power to effect powered movement of sidewalls 24, 26 between the horizontal and upright positions.

It is to be understood that the present invention is not limited to the sole embodiment described above, but encompasses any and all embodiments within the scope of the following claims:

I claim:

1. A cargo bed assembly for a truck comprising:
   a main platform having a floor,
   rear and opposing sidewalls mounted proximate to said floor and having portions extending upwardly from the periphery of said floor when in an upright position, each of said sidewalls including an interior surface portion and each of said opposing sidewalls hingedly attached to said main platform for movement between the upright position and a horizontal position, said interior surface portions substantially coplanar with said floor when in said horizontal position;
   a plurality of hinge assemblies for attaching said sidewalls to opposing sides of said main platform, each of said hinge assemblies pivotable between an open position and a right angle position, including a first hinge plate fixedly secured to one of said sides of said main platform and a second hinge plate fixedly secured to one of said sidewalls;
   a stop member extending from each of said second hinge plates, said stop member including an abutment surface and having a storage aperture and a locking aperture;
   wherein said abutment surface abuts said first hinge plate when said hinge assembly is in the right angle position.

2. The bed assembly of claim 1, wherein said stop member extends perpendicularly from said second hinge plate and has a substantially triangular profile, said stop member allowing positioning of said one of said sidewalls in weight bearing relation when in the horizontal position.

* * * * *